(12) United States Patent
Bolin et al.

(10) Patent No.: US 7,539,161 B2
(45) Date of Patent: May 26, 2009

(54) VIRTUAL CELL NETWORK

(75) Inventors: Johan Bolin, Uppsala (SE); Ari Kangas, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 833 days.

(21) Appl. No.: 10/967,310

(22) Filed: Oct. 19, 2004

(65) Prior Publication Data

US 2005/0088992 A1 Apr. 28, 2005

Related U.S. Application Data

(60) Provisional application No. 60/512,099, filed on Oct. 20, 2003.

(30) Foreign Application Priority Data

Feb. 17, 2004 (SE) .................................. 0400388-5

(51) Int. Cl.
*H04Q 7/00* (2006.01)
(52) U.S. Cl. ..................... 370/329; 370/331; 370/349; 455/456.1; 455/456.5; 455/441; 455/411; 455/436
(58) Field of Classification Search ................. 370/329, 370/331, 349; 455/456.1, 456.5, 441, 411, 455/436, 561
See application file for complete search history.

(56) References Cited

U.S. PATENT DOCUMENTS 5,555,260 A * 9/1996 Rinnback et al. ............ 370/347
6,058,317 A * 5/2000 Posti ........................... 455/561
6,115,608 A * 9/2000 Duran et al. ................. 455/436
6,188,883 B1 * 2/2001 Takemura .................... 455/411
2003/0142648 A1 * 7/2003 Semper ....................... 370/331
2004/0121774 A1 * 6/2004 Rajkotia et al. ............. 455/441

FOREIGN PATENT DOCUMENTS

| EP | 1109416 | A2 | | 6/2001 |
| KR | 2003078158 | A | * | 10/2003 |
| WO | 92-02104 | | | 2/1992 |
| WO | 01-01714 | A1 | | 1/2001 |

OTHER PUBLICATIONS

International Preliminary Report on Patentability for PCT/SE2004/001353.

* cited by examiner

*Primary Examiner*—David Q Nguyen
(74) *Attorney, Agent, or Firm*—Nixon & Vanderhye, P.C.

(57) ABSTRACT

A virtual network is created by providing antennas controlled by the same base station with control signals of different virtual base stations. A virtual network controller comprised in the base station is arranged for performing handovers between sets of physical channels of the different virtual base stations. The handover is preferably performed transparently towards the main communication network. This transparency is preferably provided by associating physical channels of virtual base stations with communication channels of the main communications network. Preferably, position estimations of a mobile terminal connected to the base station are performed by the virtual network controller, whereby such estimations can be kept secret within the virtual network.

36 Claims, 10 Drawing Sheets

VIRTUAL CELL NETWORK

This application claims priority to and benefit of U.S. Provisional Application No. 60/512,099, filed 20 Oct. 2003 and Swedish application number 0400388-5 filed Feb. 17, 2004. The entire contents of these applications are incorporated herein by reference in their entirety.

TECHNICAL FIELD

The present invention relates in general to cellular communications networks, and in particular to such networks having geographically small cells.

BACKGROUND

The possibility to determine the position of a mobile device has enabled application developers and wireless network operators to provide location based, and location aware, services. Examples of those are guiding systems, shopping assistance, friend finder and other information services giving the mobile user information about their surroundings.

In addition to the commercial services, the governments in several countries have also put requirements on the network operators to be able to determine the position of an emergency call. For instance, the governmental requirements in USA (FCC E911) require that it be possible to determine the position of a certain percentage of all emergency calls. There is no difference between the requirements put on indoor environments compared to outdoor environments.

In outdoor environments, the position estimation can be done using external methods for position determination, e.g. GPS (Global Positioning System) based methods like Assisted-GPS (A-GPS). Position estimation can also be performed using the wireless network itself. Methods using the wireless network can be grouped in two main groups. The first group comprises methods that are based on the radio cell to which a mobile terminal is attached, e.g. by using Cell-ID or E-CGI (Enhanced Cell Global Identity). The second group uses measuring of radio signals from several base stations (BS) and determining the terminal position using e.g. Time Difference (TD).

In order to be able to connect to a mobile network or to perform handover when connected, a mobile terminal typically constantly measures available signals, not only from the own base station, but also from other base stations. These signals are typically control signals intended for measuring radio conditions of transmissions, which control signals contain, among other data, information about how to establish a connection to the transmitting base station. In particular, the control signals comprise data, which by itself or in combination with the frequency of the carrier on which the control signal was transmitted constitute base station identification data. A mobile terminal can thus obtain an identity of the transmitting base station and an estimate of the radio conditions. The mobile terminal typically compiles this information, in GSM (Global System for Mobile communications) in a neighbor list, which is transferred to the network as information.

Position estimation can be based on measurements in the neighbor list. One then uses the relation between the distance from the radio base station and the radio condition in combination with knowledge about the exact position of the base station. The base station positions are known within the communications network. This means that the neighbor list easily can be used for position estimating according to different algorithms. The accuracy of the position estimation is generally proportional to the size of the cell.

Triangulations, or Time Difference (TD) methods, use signals associated with two or more different base stations. These signals are used to calculate the position or at what distance from the base station a mobile terminal is located. The calculations are based on the relative or absolute difference in the time it takes the signal to propagate between the terminal and the different base stations. The achievable accuracy of TD-methods depends on system architecture, physical conditions and radio conditions. Typically, the accuracy of a TD method in a mobile telephony system is 50 to 150 meters. TD methods are also relatively time and resource consuming.

Fingerprinting methods use the fact that all places have a, more or less, unique characteristic signature of the received radio signals. This is the result of multi-pathing and reflections in the buildings and obstacles. By storing the characteristic radio signature of different locations in a database, it is possible determine the location of a device by comparing the received signature of a signal with the signatures stored in the database. Fingerprinting methods requires an always-updated database. A good result typically also relies on being able to match signals from several different sources or base stations.

A terminal located indoors typically has a connection to a base station covering the surrounding outdoor area that is of lower quality than if the terminal would have been located outdoors. To improve the indoor coverage situation, many larger buildings are equipped with indoors mobile telephony system. The indoor system most often consists of one base station and a distributed antenna system or a leaking cable antenna. For a building spread over large areas repeaters are typically used. This results in that the entire building appears as one large radio cell and that it is impossible to determine where the terminal is located within the building. Furthermore, due to weak signals from base stations located outdoors, more sophisticated methods using e.g. triangulation is normally impossible to apply.

One straightforward solution is to use an additional system for positioning, a system that is not based on any mobile telephony system. This can be an indoor GPS system, a WLAN (Wireless Local Area Network) or a Bluetooth based system or some other sensor solution. However, such systems require additional complex equipment and also the terminals have to be equipped with special hardware and/or software, which makes the solution expensive.

Another straightforward solution is to increase the number of indoors base stations, thus reducing the size of the cells. Such a solution will also increase the totally available communication resources, since there typically appears possibilities for more efficient reuse of communication resources.

However, a base station is an expensive piece of equipment and such a solution will therefore become very costly. Furthermore, the introduction of smaller cells will increase the number of handovers that are necessary, since there is an increased probability that a mobile terminal crosses cell borders. By introducing very small cells, necessary for accurate positioning, the number of handovers will increase enormously. Consequently, the load on the BSC's or RNC's that are connected to handle the handover procedures will also increase enormously.

In some applications, introduction of a layered cell structures (with a layer of macro cells and a layer of micro cells) helps in solving the problems of frequent handovers. Mobile terminals that move relatively fast are allocated to the macro cells and slowly moving or quasi-stationary mobile terminals can be allocated to the micro cells. In this way more accurate position estimations can be performed for the slowly moving terminals. However, the introduction of macro and micro cell layers requires additional communication channels since macro and micro cells in a general case cannot use the same communication channels. Furthermore, the efforts for managing such layered structures are large, both concerning hardware and software requirements. Finally, accurate position determination of fast mobile terminals is still not possible.

In certain situations, it is requested to have an accurate position determination for purposes of local character. For instance, in a large office building or production facility, it would be possible to find the present location of any employees, if they carry a mobile terminal. This could be most beneficial for the office or facility management, but for a network operator, a location determination of "within a specific building" would be sufficient. Furthermore, some location data within e.g. a building could reveal e.g. company secrets. It is therefore in many cases required having accurate position estimation, but that is not generally available for the entire communications network, except for e.g. emergency situations. In prior art, there are no such possibilities for selective access to positioning information.

SUMMARY

A problem with prior art is that there is a difficulty to increase position estimation accuracy without significantly increase signaling traffic to radio access station controllers or managing efforts of layered cell structures. Another problem with prior art is that there are no possibilities to make position estimations selectively available for different network parties.

The technology disclosed herein provides methods and devices for improved position estimation accuracy. The technology disclosed herein provides such methods and devices that do not increase the traffic load on radio access station controllers. Yet the technology disclosed herein also provides methods and devices making position estimation information selectively available for different communications network parties and/or for a certain local area. Another aspect of the technology disclosed herein is to provide methods and devices which enhance the control possibilities for a local party, e.g. a building owner, over the radio network in a corresponding local area.

In general words, a virtual network is created by providing antennas controlled by the same radio access station with control signals of virtual radio access stations. A virtual network controller is arranged for performing handovers between sets of physical channels of the different virtual radio access stations. The handover is preferably performed transparently towards the main communication network. This transparency is preferably provided by associating physical channels of virtual radio access stations with communication channels of the main communications network. Preferably, position estimations are performed by the virtual network controller, whereby such estimations can be kept secret within the virtual network.

The advantages of the present technology disclosed herein include the fact that the virtual network can be managed partly separately from the main communication network. The amount of handover-related traffic between the radio access station and the radio access station controller can be reduced significantly. Furthermore, the handovers and position determinations utilizing virtual radio access stations can be kept secret within the virtual network.

BRIEF DESCRIPTION OF THE DRAWINGS

The invention, together with further objects and advantages thereof, may best be understood by making reference to the following description taken together with the accompanying drawings, in which.

DETAILED DESCRIPTION

In order to fully understand the operation of the present invention, first a short review of control signaling and general position estimations in cellular networks is given.

In the main part of the detailed description, systems based on GSM technology are used as exemplifying embodiments. However, the basic ideas of the present invention are not limited to the specific described embodiments, but are generally applicable to many different cellular communication systems.

Figure 1:
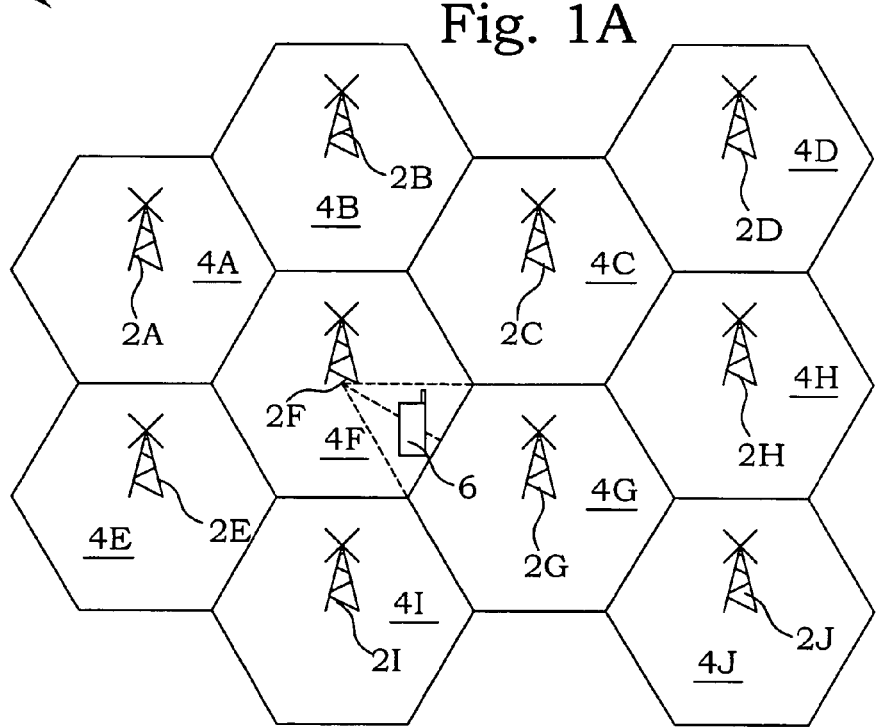
FIG. 1A is a schematic illustration of a cellular communications system.
FIG. 1B is a block scheme of connecting network elements in a cellular communications system.

The basic idea with cellular networks 10, one of which is schematically illustrated in FIG. 1A, is to structure the network as a grid of cells 4A-J where each cell 4A-J is the area covered by one radio base station 2A-J. The communication takes place via different radio resources. To avoid interference between mobile phones 6 and radio base stations 2A-J in neighboring cells, the communication between the mobile phone 6 and the base station 2A-J uses different resources or communication channels, i.e. slightly different configurations or settings, e.g. of frequencies or codes. The number of those resources or "configurations" is limited. In GSM systems, the resources are formed by a limited number of allowed carrier frequencies, and they are used to separate communication in different cells. In WCDMA (Wideband Code Division Multiple Access) systems, the resources are characterized by a limited number of different codes. The result of the limited number of radio resources means that it is important to plan the network 10 carefully.

Mobile Station (MS), Mobile Phone, Mobile Terminal and Handset all refers to the device that is movable within area covered the communications system. These terms will be used in the present disclosure as equivalent expressions. This device is typically a mobile telephone, hand held computer so-called Personal Digital Assistance (PDA) or other device or apparatus equipped with a radio receiver for cellular or mobile networks.

In FIG. 1B, a block scheme of network elements in a GSM network is illustrated. An MSC (Mobile services Switching Center) 50 is connected to other MSC's and to other external networks 52, typically via a (not shown) GMSC (Gateway MSC). The MSC 50 is connected to one ore more BSC's (Base Station Controllers) 60, and has switching means 51 for connecting different network elements connected thereto. The BSC 60 is responsible for handling one or more base stations 8, and switches traffic to and from the MSC 50 and different base stations 8 by switching functionalities 61. The BSC 60 has also means 62 for conducting handovers and means 63 for performing estimations of positions of mobile terminals connected to the base stations 8, e.g. by utilizing neighbor lists reported by the mobile terminals. Alternatively, the means 63 for estimating positions can be arranged for reporting information associated with position determination to another node in the network, where the actual estimation is performed. The base station 8 comprises a transceiver radio interface 71, which divides traffic of the different channel frequencies to transceiver units 72A, 72B. The output of the transceivers 72A, 72B are multiplexed by a multiplexor 74 and sent to an antenna 14. The functions in the base station 8 are controlled by a base station control system 73.

Communication using cellular communications systems typically involves data signals and control signals sent on traffic channels and control channels, respectively. In a GSM system, there are three classes of control channels. BCH (Broadcast Channel) comprises channels on which information about the cell and network parameters continuously are transmitted to the mobile terminals. For instance, the channel BCCH (Broadcast Control CHannel) is used for sending cell specific information. Communication on channels of the BCH takes place in the DL (DownLink) direction. The BCH data is provided by the base station 8.

Other control channels are used for paging purposes, access functionalities and signaling between network and mobile terminal before and during calls. Such control signaling is e.g. used by the mobile terminals to inform the network about e.g. measurements of neighbor transmitters. Also signaling concerning authentication are performed by such control signaling. For CCCH (Common Control Channels) and DCCH (Dedicated Control Channels), the information is typically provided from or to a BSC or MSC and is only relayed through the base station.

Returning to FIG. 1A, in most cellular networks 10, the mobile terminal 6 continuously measures the receiving conditions of the radio signals. The reasons are several. One is to be able to modify the transmission power in order to avoid sending on unnecessary high transmission power. In general, but not necessarily, the radio base station with the best radio conditions is the one used for connection to the cellular network. The base station with the best radio conditions is in most cases also the one that is located closest to the mobile telephone 6. In FIG. 1A, the mobile telephone 6 is connected via base station 2F. The mobile telephone 6 is thus located within the cell 4F of that particular base station 2F. The radio cell is defined as the area surrounding a base station, in which the base station is the base station with the best radio connection to a mobile telephone. Since the positions of the transmission points associated with the base stations are known by the cellular network, the identity of the base station with the best radio conditions hence also gives an approximate location estimate of the mobile telephone. The size of a cell is proportional to the density of base stations. In FIG. 1A, one may therefore conclude that mobile telephone 6 is present within cell 4F.

In order to know which base station to connect to, the mobile telephones constantly measure signals sent also from other base stations. These signals are special control signals intended for measuring the radio conditions between the mobile telephone and the base stations. The signals contain, among other data, information about how to establish a connection to the base station sending the signal. As mentioned above, the communications in neighboring cells are done over links with slightly different configurations in order to avoid interference. The control signals are typically transmitted using those different configurations. As an example, in GSM, the control signal from one base station is sent on a different frequency than the control signal sent from the neighboring base station. However, base stations further away could use the same frequency in a reuse pattern. To be able to separate the base stations associated with different cells, but that are sending control signals on the same frequency, from each other, the control signals also contain other information making it possible to distinguish a control signal from one base station from the other. This information, alone or in combination with the frequency of the control signal, gives a possibility to identify a particular base station. In other words, the control signals comprise base station identification data. In GSM, so-called color codes are used to separate different base stations from each other.

The network typically informs the mobile terminal about which base stations that are present in the vicinity. The mobile telephone then knows what control signals to look for. The mobile telephone may also measure signals from each other base stations if the information to be measured is not accessible. This could be the case e.g. in areas where a user's operator has no coverage, but other operators have. The results of the measurements of the control signals sent from the base stations are typically stored in the mobile terminal in a compiled manner. Such a list of neighboring base stations or at least data corresponding to such a list is kept updated in the mobile terminal, and often referred to as the neighbor list.

Figure 2:
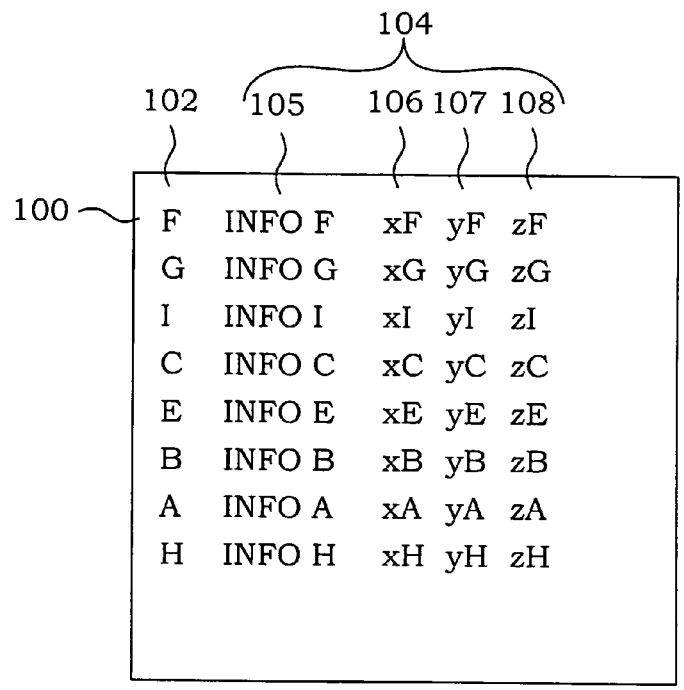
FIG. 2 is an illustration of the typical content of a neighbor list.

An example of such a neighbor list for the situation of FIG. 1A is illustrated in FIG. 2. The list is sorted based on the quality of the radio conditions, with the base stations having the best radio conditions on top of the list. Each row 100 of the list refers to one particular base station. In this example, the first column 102 comprises an identity of the base station. A second portion 104 comprises additional information. In the present embodiment, a second column 105 comprises general information. The third to fifth columns 106-108 comprise data associated with e.g. measures of the quality of the radio conditions to each base station, signal quality, barring flags or similar data important for handover decisions.

The measurements of such a list are continuously transferred to the base station to keep the network updated regarding radio conditions. The base station, or any network server connected to it, can thereby retrieve the content of a neighbor list of any connected mobile terminal.

In the present disclosure, the expressions "position" and "location" will be used. Position is intended to mean a geographical position given as coordinates or degrees (e.g. the WGS-84 datum). It may also contain orientation and/or heading, speed, acceleration etc. A position may also be given as a relative measure. The location is a more subjective position defined by the type of (or relation to) facility or place. Examples of locations are: "military area/facility", "hospital", "office", "theatre", "near emergency exit". The expression "location" is assumed to comprise also what is comprised by "position".

The most trivial position estimation is to determine the approximate position as inside the cell of the base station with best radio connection with the mobile terminal, i.e. the base station at the top of the neighbor list. In FIG. 1A, this means that it is possible to conclude with a certain probability that the mobile telephone 6 is situated within cell 4F. Using several entries in the neighbor list for different algorithms means that a better accuracy than the cell where the mobile phone is camping can be calculated. In FIG. 2, it is seen that base station 2G has the second position in the neighbor list. It is then very probable that the mobile telephone is situated in a 60° sector facing the cell 4G, marked with broken lines in FIG. 1A. Furthermore, since base station 21 is the third entry in the neighbor list, it is also probable that the mobile terminal 6 is situated in the half of the sector that is closest to cell 4I. Additional accuracy can furthermore be achieved by considering e.g. signal strength ratios etc.

The translation or calculation translating the neighbor list to a position and/or location estimate may take place either in the cellular system or in the terminal. If the position estimation takes place in the system, e.g. in a network server, the mobile terminal has to transmit the neighbor list or measurements corresponding to it to the radio base station. If the mobile terminal itself performs the estimation, the estimation can in a basic concept e.g. comprise a determination of a closest base station in form of e.g. a cell-ID. Such position information can in certain cases be enough to support many of the services based on position determination. However, if the actual geographic position is to be estimated, the mobile terminal first needs information about the particular surroundings. Such information should contain at least the known positions of the different base stations and could e.g. be deduced from instructions concerning base stations to be measured. Other information that may be specific to the location, building or surroundings may also be useful. Such specific information about e.g. a specific building could comprise map information, from which it is possible to exclude certain areas where a mobile cannot be located from the position determination. It is e.g. obvious that a mobile terminal can not be located within a solid wall, and it is most likely that the mobile is not hovering in the air 10 meters above the floor.

Figure 3:
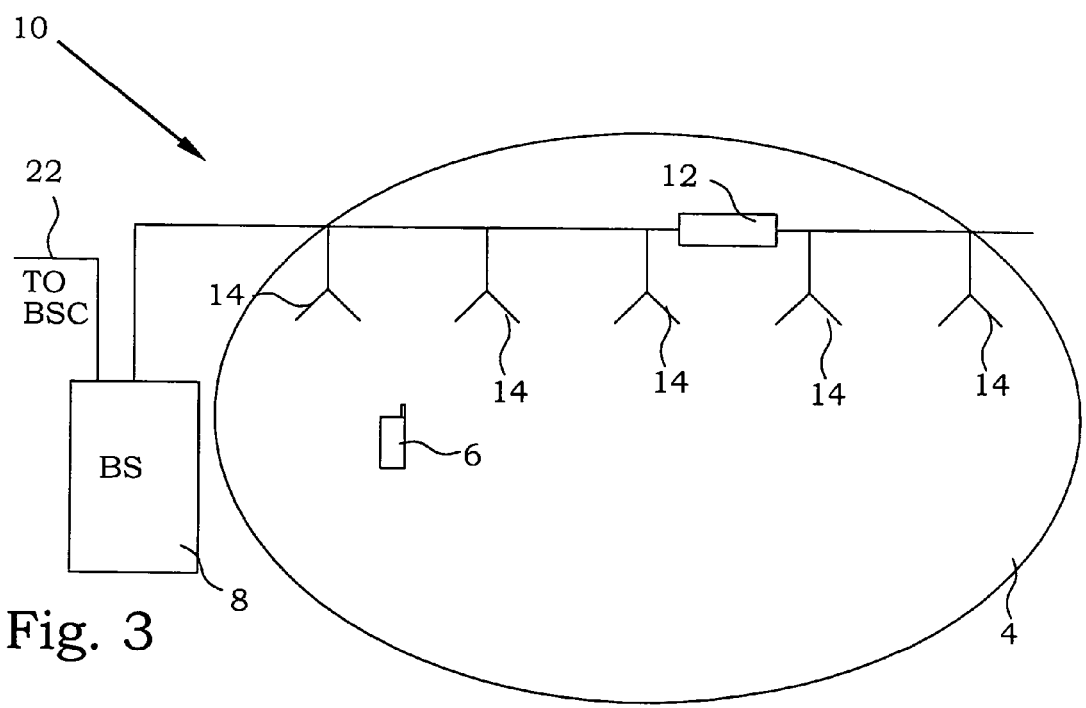
FIG. 3 is a schematic illustration of a distributed antenna system according to prior art.

Indoors coverage in cellular systems is often of a lower quality than outdoors. Therefore, many larger buildings have their own local cell or cells. A typical prior art system is illustrated in FIG. 3. One single base station 8 serves a distributed antenna system comprising a number of antennas 14 distributed over the indoors area. A repeater 12 can be present in order to enhance the signals during distribution. Since all antennas provide the same information, a mobile terminal 6 experiences all antennas 14 together as one transmitting system, being associated with one single cell 4. Furthermore, since the mobile terminal 6 is unaware of which antenna it is actually communicating with, refined position estimation as described above is less likely to operate well. One way to improve position estimation accuracy is to provide smaller cells.

Distributed antenna systems as well as leaking cable systems and subsystems that are fed by a repeater or any other active component are assumed to be particularly well suited for implementing the technology disclosed herein. The term "antenna" is normally used both for an antenna in a distributed antenna system, but also for a section of a leaking cable on a leaking cable antenna. However, the present invention is applicable to all possible types of antenna systems.

The typically bad connections to the base stations for the outdoor coverage, in combination with an environment with a lot of fading, also makes it difficult or even impossible to use base stations located outdoors for triangulation purposes. In some buildings that are spread over large areas (e.g. airports), repeaters are used. The cell then becomes even larger resulting in that the area in which the mobile phone is when connected to that cell is very large, i.e. the position estimation accuracy is low.

The accuracy of position estimation based on neighbor lists is basically proportional to the cell size. Smaller cells will in general enable more accurate and precise position estimations. However, cells are controlled by a base station, and base stations are generally very expensive. The functionalities required in a base station that are used for position estimation are, at least in methods where the base station not actively takes part in the positioning, very limited. In fact, if only control signals comprising base station identification data is transmitted from well-defined positions, this is enough for performing the positioning routines.

As mentioned above, the technology disclosed herein is applicable to most cellular communications networks. However, as also mentioned above, it is presently believed that it is particularly advantageous when applied to position estimation of mobile terminals located in a distributed antenna system, a leaking cable system or a sub-system fed by a repeater. The accuracy of the position determination method according to the technology disclosed herein depends on e.g. the premises or environment where the technology disclosed herein is to be implemented and other pre-requisites as well as various customer requirements. However, a position accuracy of 20-50 meters is believed to be realistic. The present technology disclosed herein could advantageously be used for positioning of mobile terminals located in indoors systems, underground railway systems (subways) and sub-systems connected to cellular macro systems, e.g. tunnels connected to a macro radio cell using a repeater.

Figure 4:
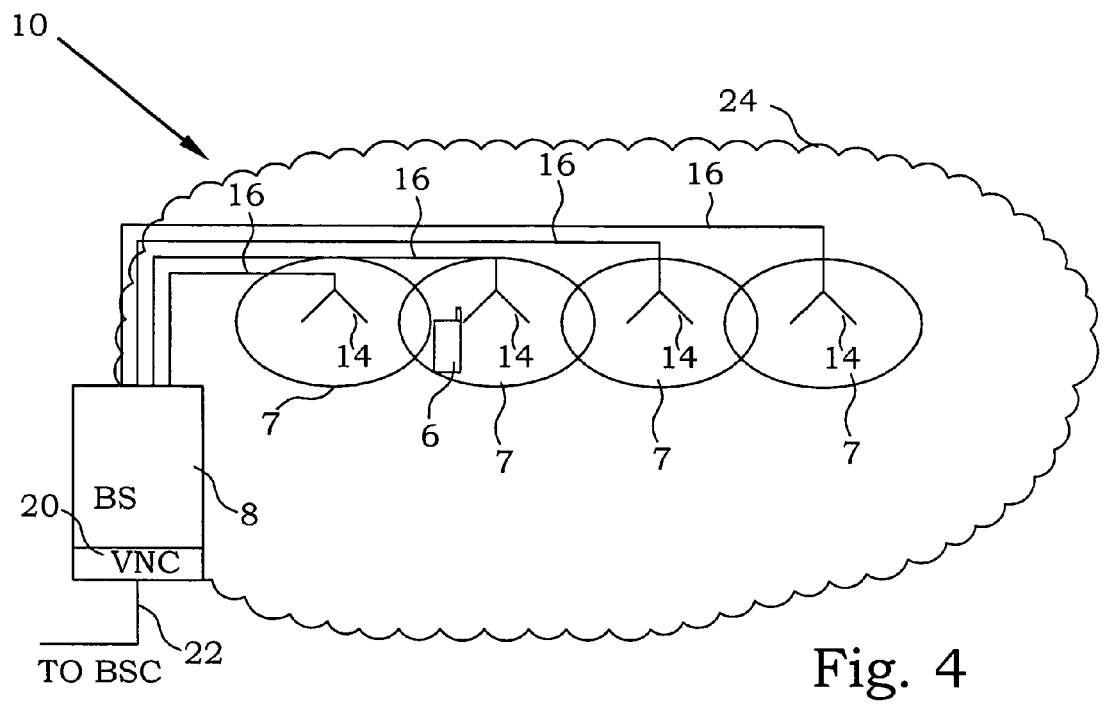
FIG. 4 is a schematic illustration of a part of a radio network according to an example embodiment.

The basic concept of the technology disclosed herein is to divide a larger cell into several smaller virtual cells. The virtual cells are virtual in the sense that they are not known, or at least not completely known, by the macro network. The virtual cells together constitute a local virtual cellular network, controlled by a base station having a VNC (Virtual Network Controller). Much of the intelligence to handle the connections to the mobile telephones that usually is performed in the network components such as the BSC in GSM or the RNC (Radio Network Controller) in WCDMA, is comprised in the VNC. An embodiment of a radio network according to the technology disclosed herein is schematically illustrated in FIG. 4. Here, four antennas 14 are connected to a base station 8 by separate antenna cables 16. Each antenna 14 transmits control signals with separate virtual base station identification data on different broadcast channels, and each antenna 14 constitutes the center of a virtual cell 7 in a local virtual cellular network 24. The base station 8 is further connected to a BSC via a connection 22. The base station 8 comprises, physically and/or logically, a VNC 20.

The VNC 20 comprises functionalities for handling intra-virtual-network handovers. If a mobile terminal 6 moves from one virtual cell 7 to another, the VNC 20 has the full responsibility for handling a handover between channels available at corresponding antennas 14.

The mobile terminal 6 experiences the virtual cells 7 as normal cells in a normal cellular network, and does not notice the existence of a VNC 20. The mobile terminal 6 therefore provides measurements on neighboring control channels just as in a normal cellular network, and reports such measurements to the communications network. However, according to the technology disclosed herein, some of the information provided by the mobile terminal 6 is terminated in the VNC 20, or at least monitored and (if suitable) forwarded to the BSC.

In a preferred embodiment of the technology disclosed herein, the VNC terminates any information having connection with the local virtual cellular network 24. This means that the BSC controlling the base station 8 and the rest of the cellular network doesn't experience the virtual cells at all. From the main network point of view, the base station 8 and VNC 20 operate as a base station of a single cell.

The division of one cell into several virtual cells 7 of a virtual network 24 provides the mobile terminal 6 with more exact information about its actual location. The control signaling from each of the antennas 14 can be measured and provide a base for a more accurate position determination. At the same time, the main communications network is not bothered by the increased cell division, or at least to a very low degree. The assumed increased need for handovers within the virtual network 24 is handled internally, i.e. by the VNC and the BSC only takes care of handovers from the virtual network 24 to any other external cell and from any other external cell to the virtual network 24. In a preferred embodiment, the BSC doesn't even know about the existence of the virtual cells 7.

Figure 5:
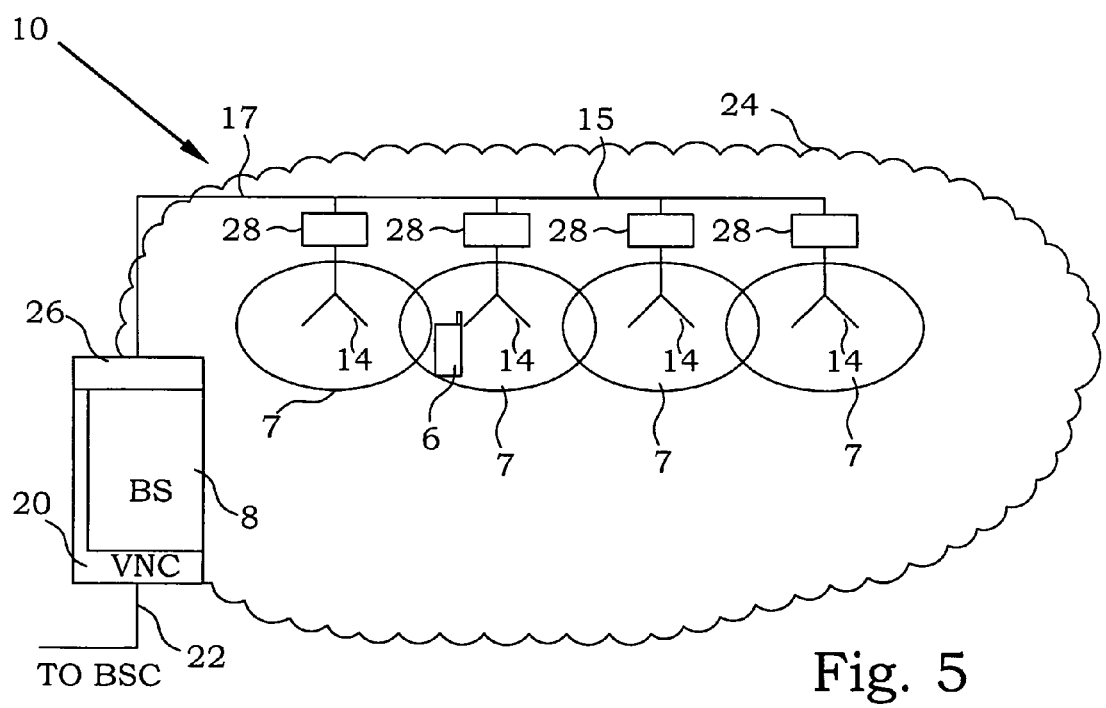
FIG. 5 is a schematic illustration of a part of a radio network having a distributed antenna system according to an example embodiment.

When creating a virtual cellular network 24 as in FIG. 4, typically a number of new antennas have to be provided. However, if the ideas according to the technology disclosed herein are implemented in e.g. a distributed antenna system, the already existing antennas can be utilized. In FIG. 5 an example embodiment of the technology disclosed herein having a distributed antenna system is schematically illustrated. Four antennas 14 of a distributed antenna system 15 are connected by a common antenna cable 17 to the base station 8. As above, each antenna 14 transmits control signals with separate virtual base station identification data on different broadcast channels, and each antenna 14 constitutes the center of a virtual cell 7 in a local virtual cellular network 24. The base station 8 is further connected to a BSC via a connection 22. The base station 8 comprises, physically and/or logically, a VNC 20. In the present example embodiment, the VNC 20 also comprises a signal injector 26, which multiplexes control signals to all antennas 14 onto the common antenna cable 17. At each antenna 14, a signal selector 28 is provided, which filters the signals on the common antenna cable 17 in order to extract signals of relevance for that particular antenna. These devices will be described more in detail further below. In such a configuration the VNC 20 comprises a central unit 20 and a number of satellite units 28, but are still logically parts of the base station 8.

Figure 6A:
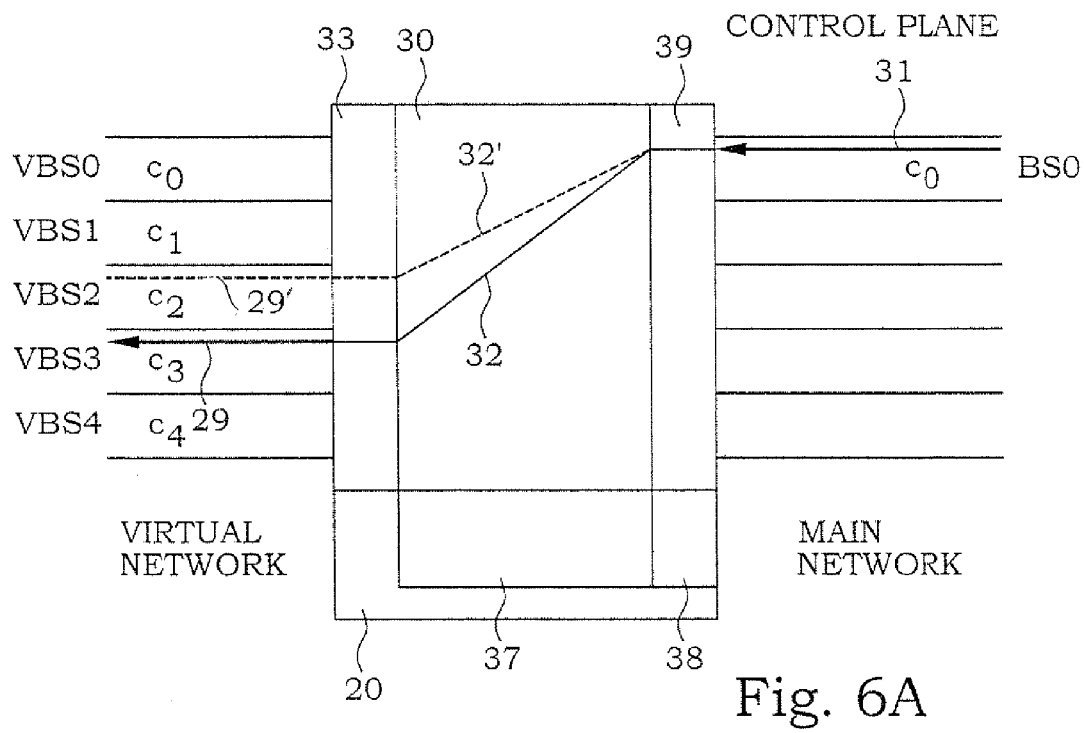
FIGS. 6A and 6B are schematic illustrations of a translation functionality of a virtual network controller according to an example embodiment in control and data plane, respectively.
Figure 6B:
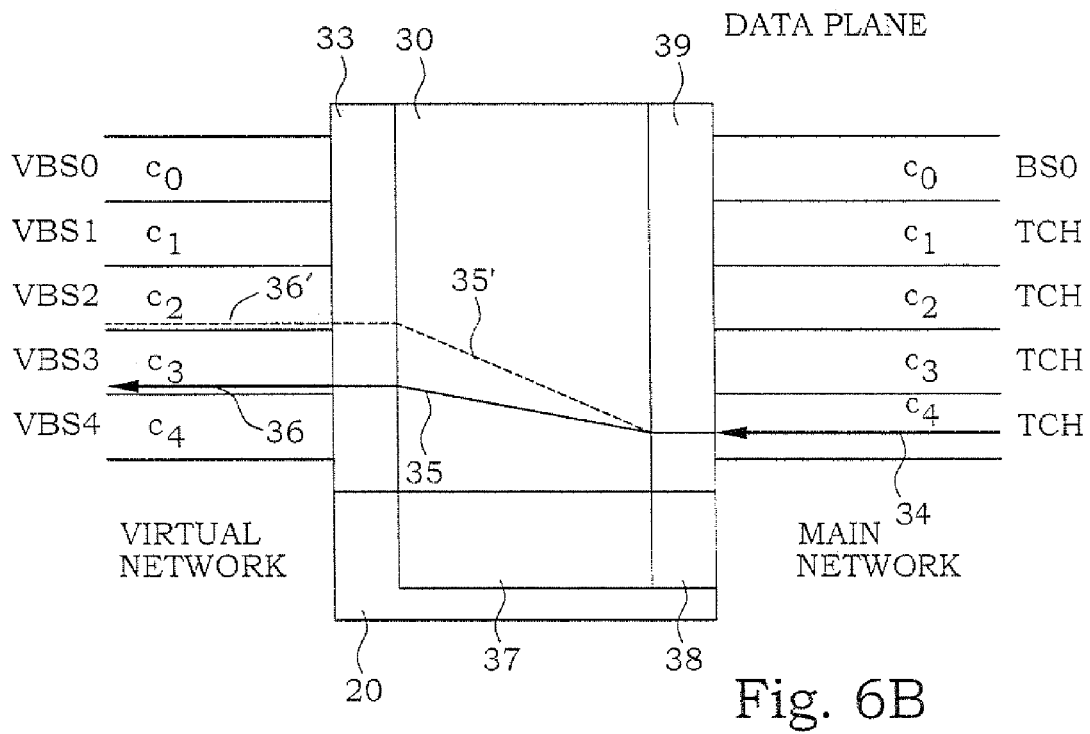

FIGS. 6A and 6B illustrate the principles of making the virtual network 24 invisible to the outside system by schematically representing available channels for control signals and data signals, respectively. In FIG. 6A, five sets of physical channels c0 to c4 are depicted. In the present embodiment, it is assumed to be a GSM system and the sets of physical channels correspond to different carrier frequencies. In the right part of the figure, the channel situation at the BSC side is illustrated. The carrier frequencies $c_0$ to $c_4$ are at the main network side assigned to a base station with a BSIC "BS0". Carrier frequency c0 is used for control channels, in particular time slots 0 (out of 8). Carrier frequencies $c_1$ to $c_4$ are used as pure traffic channels, and so are the time slots of carrier $c_0$ not used for control signaling.

The carrier frequencies $c_0$ to $c_4$ are at the virtual network side assigned to five different virtual base ations with respective BSICs "VBS0" to "VBS4". Each virtual base station is astssigned a particular carrier frequency $c_0$ to $c_4$, on which both control signaling and data traffic should be transferred.

Control signals 31 for a mobile terminal connected to the base station BS0 are sent intended for a particular time slot of frequency carrier $c_0$. The carriers, or in reality signals intended to be sent on these carriers, are brought to the VNC 20. The VNC 20 comprises a channel translator 30, which associates a communication channel of the external network with an internal virtual cellular network physical channel. This is illustrated by the line 32. Here it can be seen that the control signals 31, arriving at a time slot of $c_0$ are associated with a time slot in the carrier $c_3$ on the virtual network side, as illustrated by the line 29. The carrier $c_3$ is assigned to virtual base station VBS3. The content of the BCH part of the control signaling is normally provided by the base station. In the technology disclosed herein, such a functionality is easily integrated in the VNC in a control signal injector 33. The control signal injector 33 provides in the present example BCH data defining the VBS3, and inserts this data into the control signals sent towards the virtual network. Also DCCH control signals may have to be modified, both in UL (UpLink) and DL direction, in accordance with the association 32 of the channel translator 30. This is performed by a DCCH modifier 39. In DL signals, any data referring to the actual carrier used or by the identity of the base station is exchanged for corresponding data for the associated channel in the virtual cellular network. In UL signals, a corresponding exchange of data takes place.

The corresponding data plane is illustrated in FIG. 6B. Data traffic 34 associated with the control signals 31 of FIG. 6A is allocated to a particular time slot of carrier $c_4$ on the main network side. As illustrated by line 35, the channel translator 30 of the VNC 20 associates, this incoming channel with a time slot of carrier $c_3$ 36 on the virtual network side. The content of the data is unchanged. By such a configuration, the main network will be essentially unaware of the actual channel used in the virtual cellular network.

Since only the VNC 20 has the entire knowledge of the radio connections within the virtual network, intra-virtual-network handovers have to be handled by the VNC or devices connected thereto. The VNC 20 therefore also comprises a handover manager 37. When a mobile terminal connected to the virtual base station VBS3 experiences a too low signal level, it wants to make a handover. A neighbor list of the terminal is intermittently sent in the form of measurement reports on the DCCH in the UL direction. Since the DCCH modifier 39 has access to that information, appropriate choices for handover can be made by the VNC 20. If it is assumed that the mobile terminal has come closer to virtual base station VBS2, the handover manager 37 issues instructions to change the association of the channel translator 30. The control channel on $c_0$ on the main network side is now associated 32' with a time slot of carrier $c_2$, i.e. 29', on the virtual network side. In analogy, the association of traffic channels is changed according to 35' to a traffic channel in carrier $c_2$, 36'.

The main network will be totally unaware of such a handover procedure. The BSC will therefore not experience any increased load due to the increased number of handovers. Even if the VNC 20 in certain applications is not configured to totally separating the channel spaces of virtual and main networks, the VNC 20 may handle the actual handover, and then only report the new utilization to the BSC.

In a radio network, having a virtual cellular network that is logically separated from the rest of the radio network, also position determination means have to be incorporated in the VNC. In FIGS. 6A and 6B, a position estimator is denoted by the reference number 38. This position estimator 38 has access to the associations in the channel translator 30 and by having access to accurate position data of the antennas and data connecting a certain carrier with a certain antenna, the position estimator 38 can easily determine a first approximation of the mobile position. Furthermore, since the DCCH data generally is modified within the VNC, the position estimator 38 can also easily be provided with information from the neighbor list of the mobile terminal. This information can then be used to refine the position estimation. The actual position estimation as such may, however, be performed according to well-known prior art procedures.

Figure 7A:
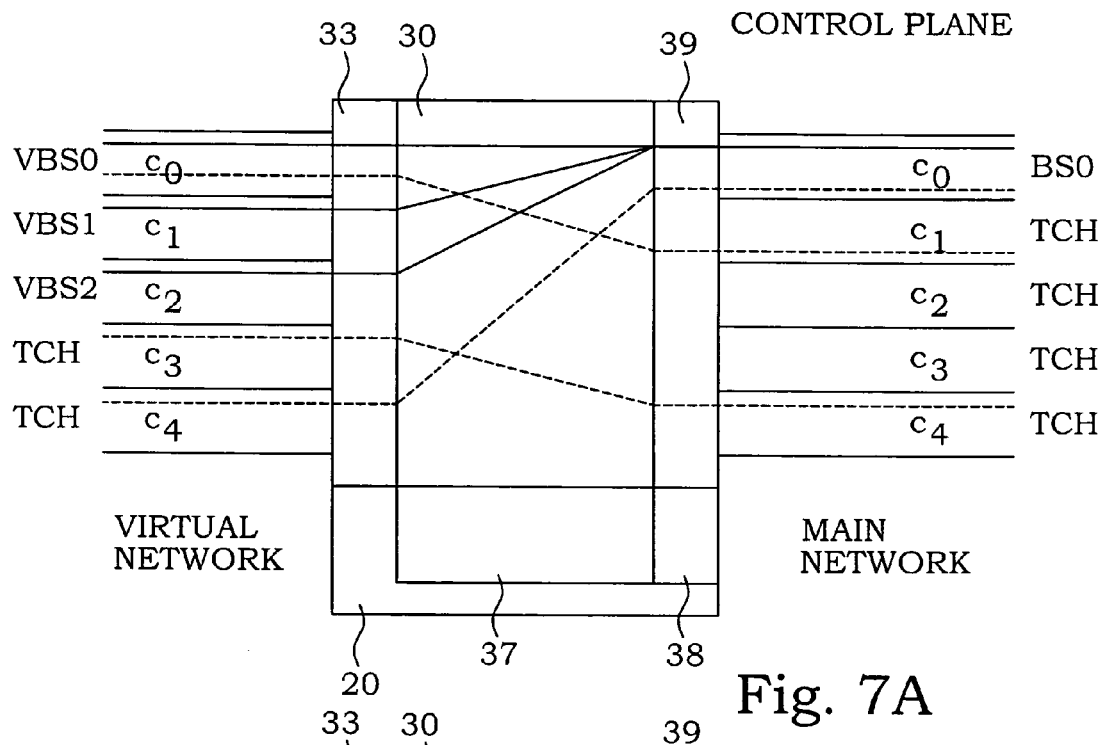
FIGS. 7A and 7B are schematic illustrations of other example virtual network controller embodiments.

In FIG. 7a, a situation, where there are more available channels than virtual cells, is illustrated. In this figure, control channels are depicted as full lines, whereas traffic channels are depicted as broken lines. Three virtual base stations VBS0 to VBS2 are comprised in the virtual network. The virtual base stations occupy one carrier each for control signaling, in the present example, carriers $c_0$ to $c_2$. The carriers $c_3$ and $c_4$ are used as pure traffic channels also at the virtual network side. Control signaling from the control channel in $c_0$ at the main network side is associated with respective control channels in $c_0$ to $c_2$ at the virtual network side. Also traffic channels are associated, not only to the respective dedicated channels $c_0$ to $c_2$, but also to the general traffic channels on $c_3$ and $c_4$. In one embodiment, also the traffic channels on $c_3$ and $c_4$ may be dedicated, i.e. intended for a certain virtual base station. However, in another embodiment, the traffic channels on $c_3$ and $c_4$ can constitute a common resource for all virtual base stations to use. However, the VNC has to keep records on which common traffic channels that are in use.

Figure 7B:
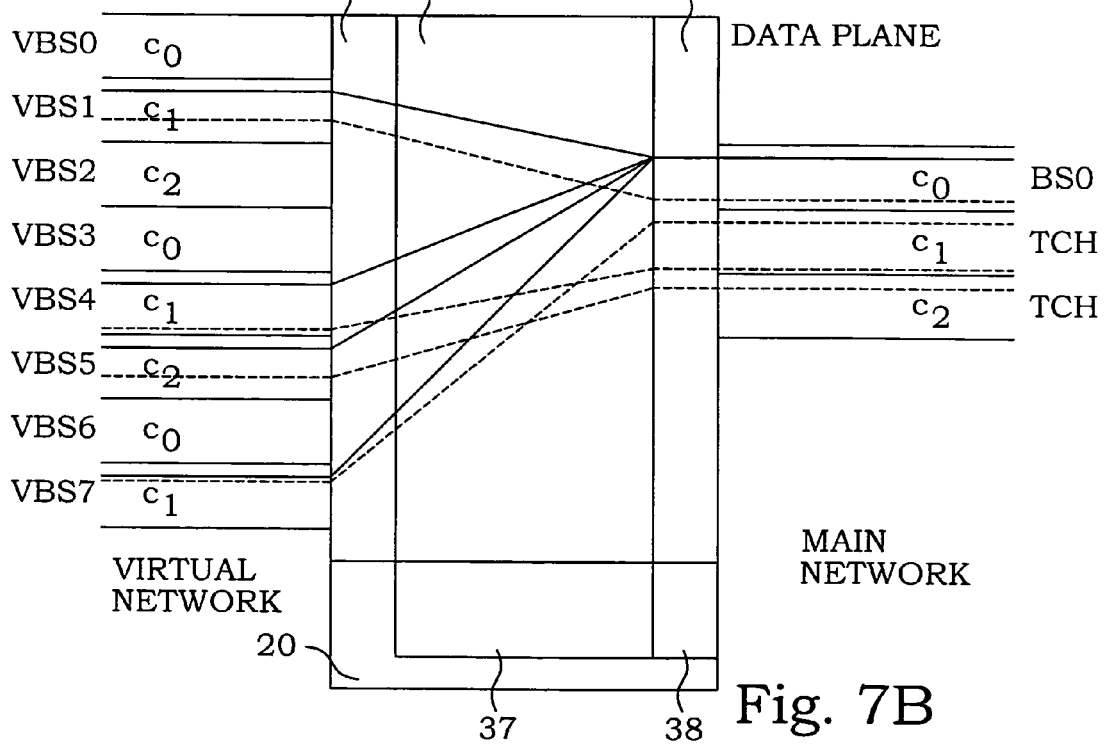
Figure 7C:
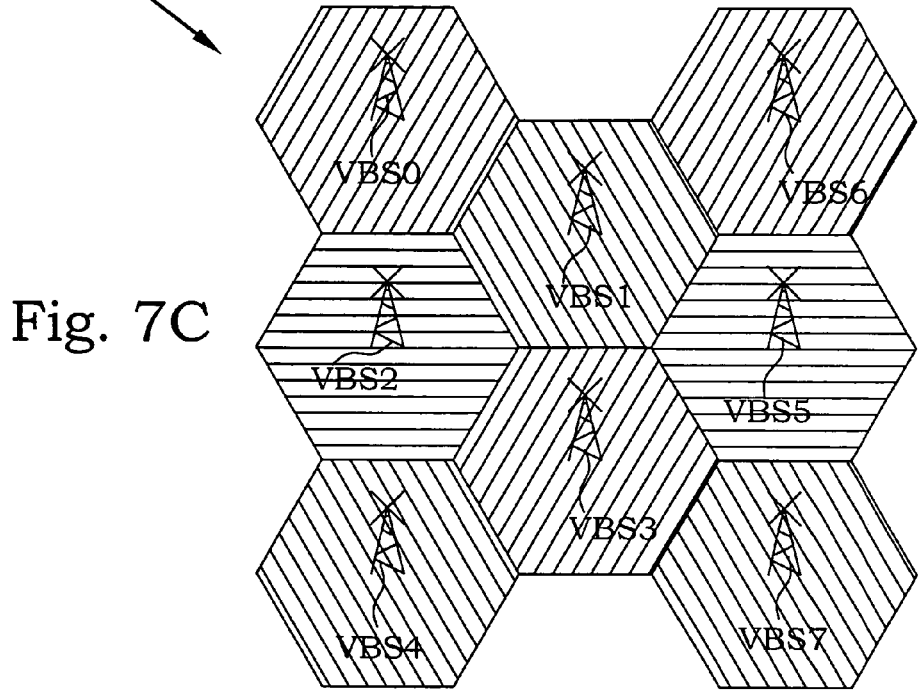
FIG. 7C is a schematic illustration of reuse of carriers in an example embodiment of a virtual cellular network.

FIG. 7b illustrates a system, where there are more virtual base stations than available carriers. In this case, only three carriers $c_0$ to $c_2$ are available, but 8 virtual base stations VBS0 to VBS7. Virtual base stations VBS0, VBS3 and VBS6 are assigned the same signal channel carrier frequency. The same is true for VBS1, VBS4 and VBS7, an also for VBS2 and VBS5. The cells corresponding to these virtual base stations are schematically illustrated in FIG. 7c. Here, it can be seen that the virtual network is arranged employing carrier reuse, at least for the carrier used for control signaling. Two neighboring cells do not use the same carrier, while cells at longer distances may. The VNC associates the control signals of the $c_0$ carrier on the main network side with a proper control signal carrier on the virtual network side. BCHs on the virtual network side are also provided with virtual base station identification data, which makes it possible to distinguish between virtual base stations utilizing the same carrier frequencies. For instance, control signals to VBS0 and VBS3 are transmitted on the same carrier frequency, but the BCH intended for VBS0 is different from the BCH intended for VBS3. In this embodiment, the virtual base stations VBS0-7 have only access to one carrier each, which means that the traffic data, illustrated by broken lines, have to be associated with the same carrier frequency as is used for the control signal at the virtual network side.

From FIGS. 6a-b, 7a-c, anyone skilled in the art realizes that different combinations of carrier utilization can be employed. For instance, also a carrier reuse virtual network configuration can be combined with the use of pure traffic data carriers. In such a configuration, the traffic carriers may be dedicated to specific ones of the virtual cells or may be used as a common resource for the entire virtual network.

Figure 8:
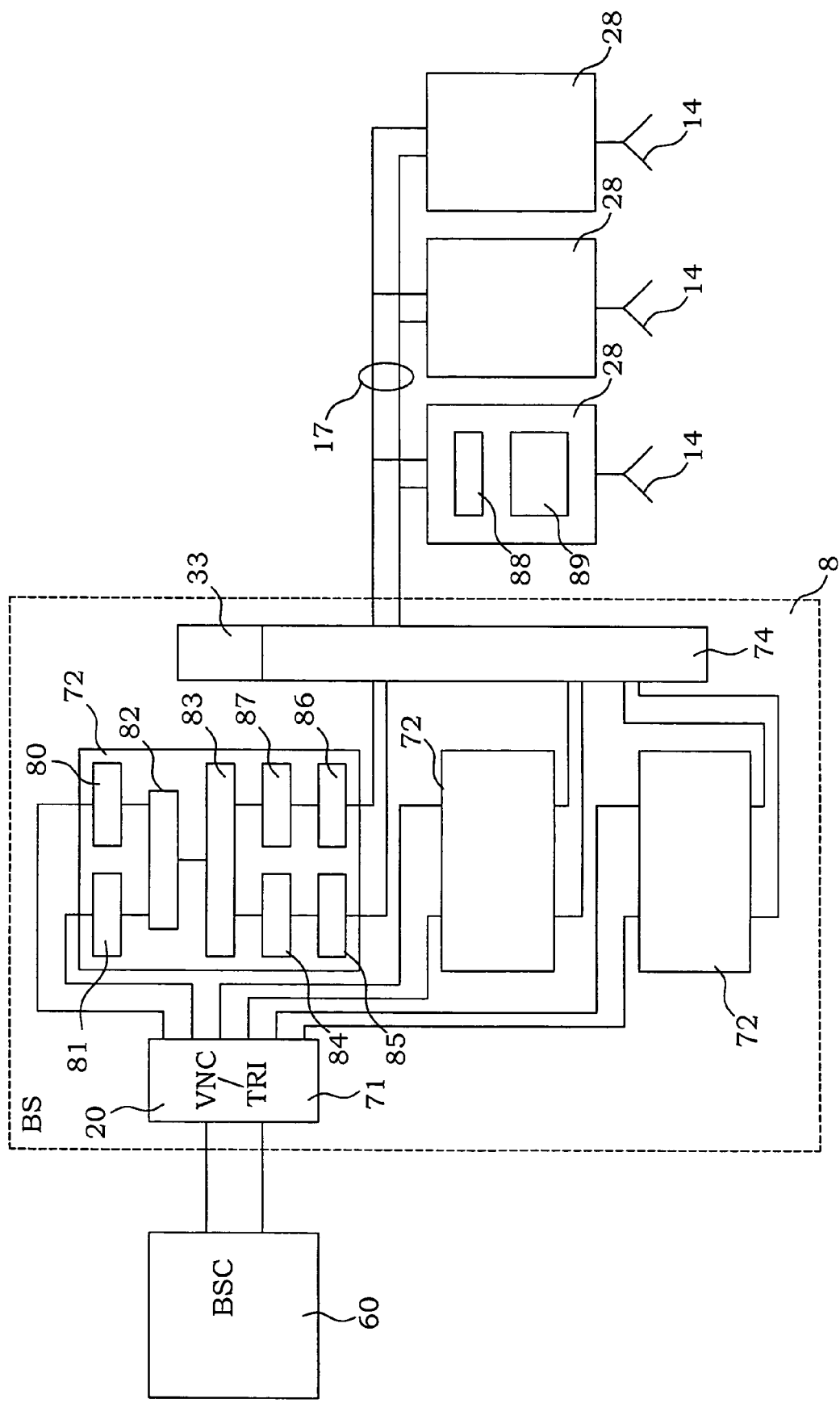
FIG. 8 is a block scheme of an example embodiment of a radio base station.

The implementation of the functionalities of the VNC can be made in many different manners. FIG. 8 illustrates a block diagram of one embodiment of a possible configuration. A base station 8 is connected to a BSC 60. The main part of the VNC 20 functionality is placed at the input of the base station 8, and may preferably be integrated with a transceiver radio interface 71 of the base station 8. The VNC translates the intended carriers and the control signaling used during the communication with BSC into virtual network carriers and virtual network control signals, as described above. The output of the VNC 20 is divided into outputs for each intended virtual network carrier. Each output, comprising a data traffic output and a control signal output or only a data traffic output depending on the utilization of the carrier in question, is connected to a transceiver unit 72. The control signals and data traffic are typically processed in separate error handling units 80, 81, before being encoded in a codec unit 82. The encoded signals are typically released in bursts and the encoded signals are thus processed in a burst handling unit 83. DL signals are multiplexed onto the available channels of the carrier in a channel multiplexor 84 and modulated in a modulator 85. UL traffic is in analogy demodulated in a demodulator 86 and demultiplexed in a channel demultiplexor 87.

In the present embodiment, a distributed antenna system is assumed, and all the used carriers are transferred to the antennas on one common antenna cable 17. The modulated signals to and from the transceiver unit 72 are multiplexed in an antenna transfer multiplexor 74. The antenna transfer multiplexor 74 and the BCCH injector 33 operates as a control signal injector (c.f. FIG. 5). Preferably, the control signal containing carriers are multiplexed in a manner that is easy to extract or filter out. The multiplexed signal is sent on the antenna cable 17 and reaches signal selectors 28 at each antenna 14. The signal selectors comprise a filter 88 or separating unit, which separates out the carrier containing the control signals intended for the virtual base station associated with that particular antenna and any common traffic carriers, if any. These separated carriers are demultiplexed in a demultiplexor 89 and modified into the proper characteristics for transmission. The signals of the separated carriers are then transferred as radio frequency electromagnetic waves by the antennas 14. The corresponding functionalities are present for UL communication in the signal selectors 28 and the multiplexing units 74, 89.

Figure 9:
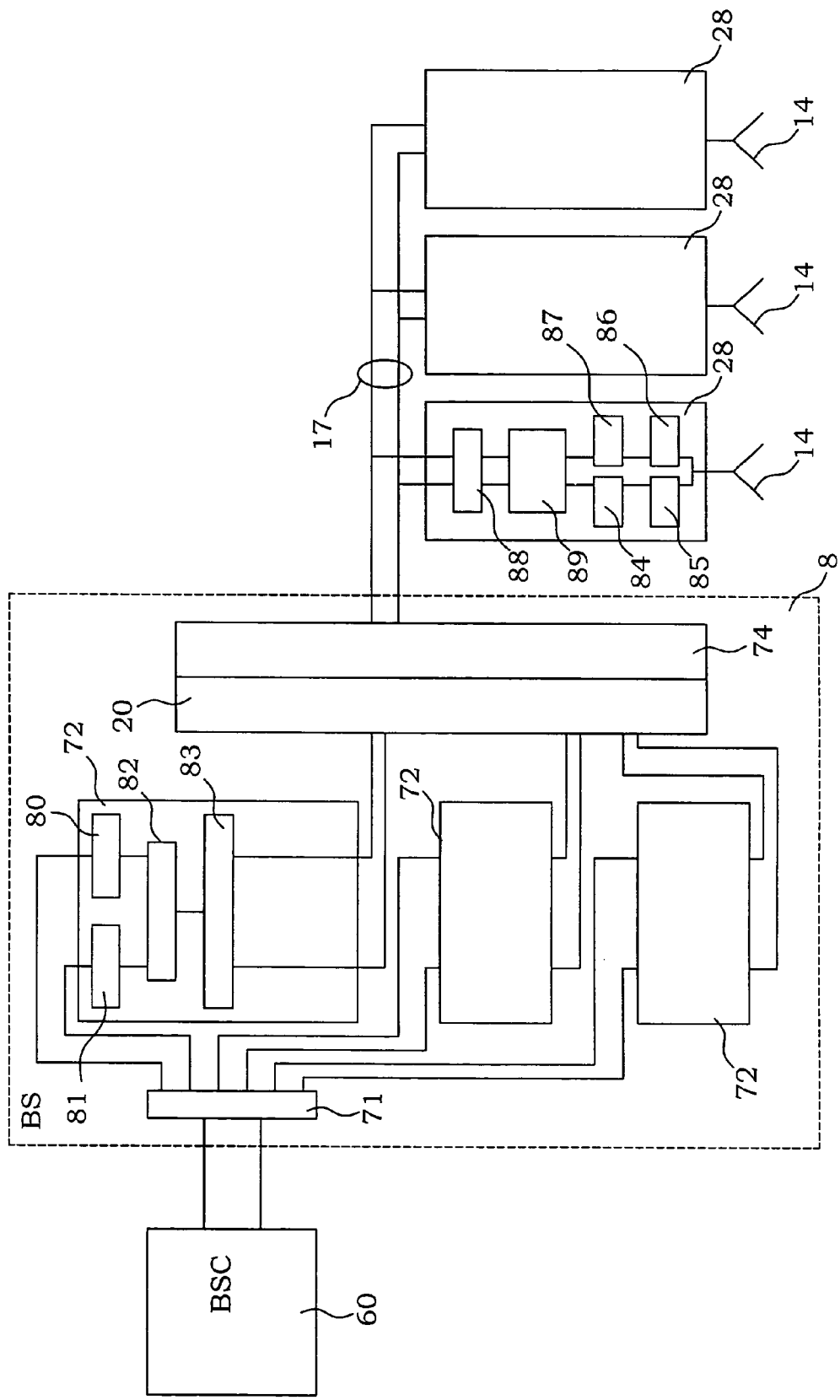
FIG. 9 is a block scheme of another example embodiment of a radio base station.

FIG. 9 illustrates another embodiment of the implementation of a VNC in a base station. Here the functionalities of translating carriers and control signals are provided DL with respect of e.g. coding and burst handling. The BSC 60 is connected to a transceiver radio interface 71 in the base station 8, and signals intended for the different carriers are switched to separate transceiver units 72. The transceiver units 72 are in an ordinary manner arranged for error handling, encoding and burst handling. The output from the burst handling unit 83 is, however, in this embodiment connected to the VNC 20, which performs necessary translation of carriers and data associated with the virtual base stations. The signals intended for the different virtual network carriers are multiplexed in a multiplexor 74 and transferred onto the common antenna cable. The signal selectors 28 in this embodiment are in addition to filtering 88 and demultiplexing 89 units also provided with a channel multiplexor 84, a modulator unit 85, a demodulator unit 86 and a channel demultiplexor 87, which normally are situated within the main base station 8.

Many other implementations of the present invention are possible, and the present protection should not be constrained only to the exemplifying embodiments, but instead entirely defined by the appended patent claims.

The basic idea of the technology disclosed herein—the separation of the virtual network from the main network, gives additional possible advantages. Since the virtual network base stations are used only in the virtual network, the main network can be totally unaware of the existence thereof. However, for providing an improved position determination, the knowledge of the virtual base station positions have to be utilized. This means that also the position determination functionality has to be provided by the VNC or any server connected thereto, as described briefly above. The VNC has the total knowledge of the virtual network configuration, and the mobiles connected thereto continuously send measurement reports corresponding to their neighbor lists. An accurate position determination can thereby be provided.

Figure 10:
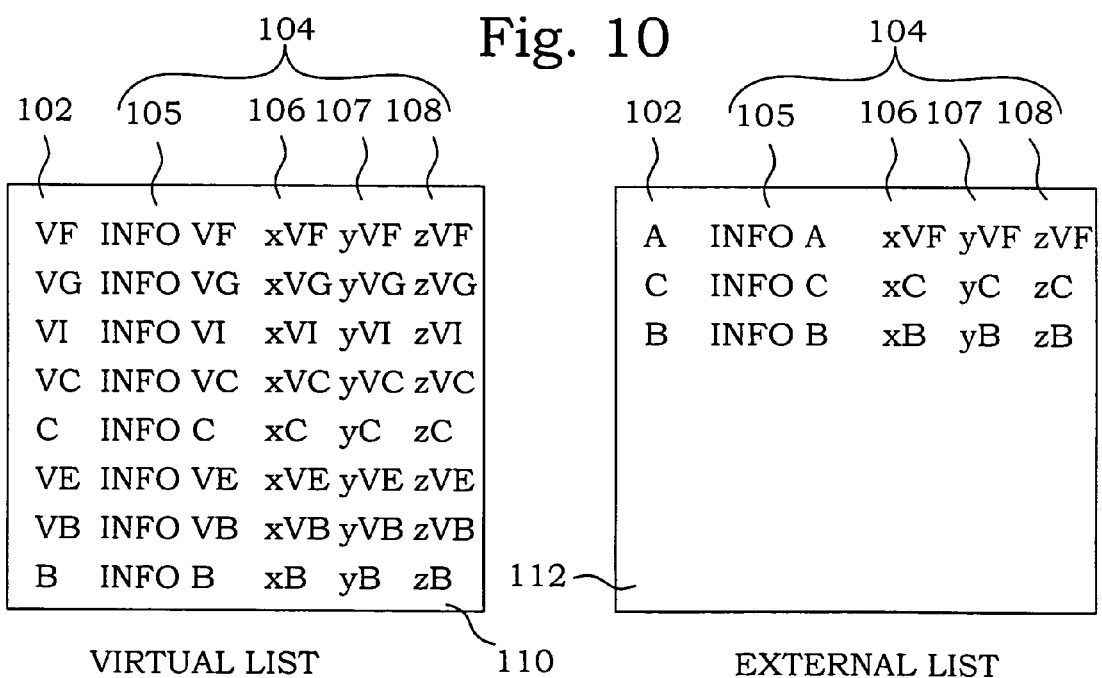
FIG. 10 is an illustration of a translation between internal and external neighbor lists.

In situations, where the base station comprising the VNC is operated by e.g. a company or an authority, this accurate positioning might be worth to protect. Knowledge about how the motion patterns of a specific mobile terminal can be used e.g. for planning terrorist attacks or for industrial espionage. In such a case, the operator can choose to keep the accurate position secret to the rest of the communications network. The only information given to the outside network will be the existence of the mobile terminal somewhere inside the cell of the base station. The measurement reports of the mobile terminal, i.e. its neighbor list, has to be modified accordingly before being forwarded to the external network. FIG. 10 illustrates such a neighbor list modification. At the left side, a neighbor list for internal use in the virtual network is illustrated. This list comprises entries corresponding measurements of virtual base station signals, denoted by an initial "V", and measurements of ordinary base station signals. The VNC is comprised in a base station that for the external network is denoted by "A". The VNC modifies the neighbor list before it is forwarded to the external network. Since the first entry is a virtual base station, this entry is taken as the main signal for the entire virtual network. The measurement values, e.g. radio condition quality, are kept, but now referring to the "normal" base station "A". Remaining virtual base station entries are removed and only the ordinary base station entries are kept. The main network receives the modified neighbor list and can use this for a position determination of somewhat less accuracy.

If an accurate position shall be exported to the macro network, i.e. the network outside the local network, this must be handled and authorized by the VNC and/or the positioning unit. In a system, where the local position estimation is kept secret, there is preferably a functionality that overrides this secrecy when an emergency call is initiated. An emergency call could be detected by the VNC, which then may provide the operator by the complete position information.

Figure 11A:
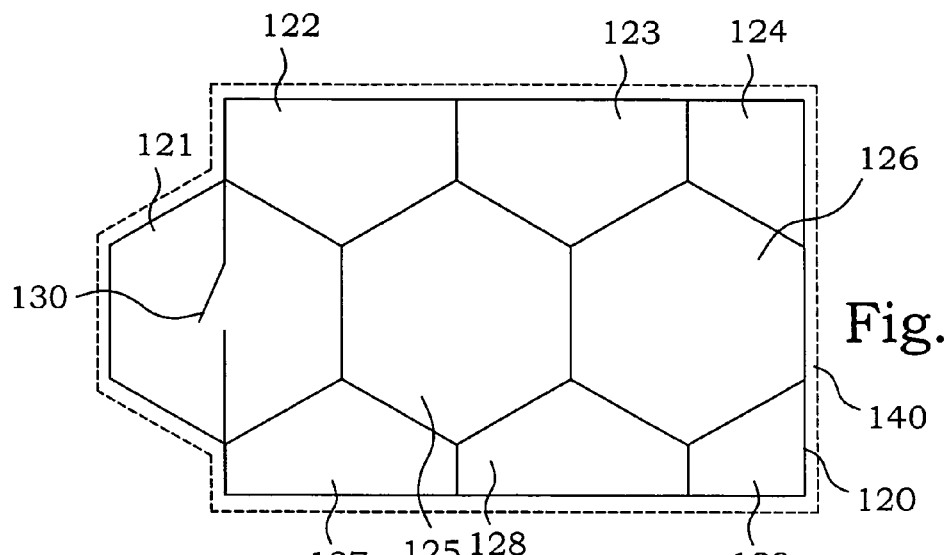
FIGS. 11A-C are cell plans of example virtual networks.

The situations when a mobile terminal enters or leaves the virtual network call for some additional arrangements. In FIG. 11A, a building 120 is equipped with a virtual network of nine virtual cells 121-129, but is externally regarded as one cell 140. The building 120 has one entrance 130, which is covered by virtual cell 121. Since use of the virtual network only is interesting upon entering through the entrance 130, the virtual cell 121 can be used as an entrance virtual cell. This virtual cell has then preferably the same BSIC and control carrier frequency as the "external" cell 140.

When a mobile terminal is handed over to cell 140, which is controlled by a base station having a VNC, the mobile terminal is entered into the virtual network. The mobile terminal receives information about virtual cell BSIC's and control carrier frequencies to search for from the VNC. The VNC also takes over handover and position estimation routines. The virtual base stations will thereby appear in the neighbor list. When the mobile terminal moves around within the building 120, handover to other virtual cells will be performed by the VNC. The BSC still imagines that the mobile terminal is in cell 140.

When the mobile terminal leaves the building and the signals from the virtual cell 121 becomes too low, external cells are again available at the top of the neighbor list, and the mobile terminal requests a handover to one of these cells. The VNC recognizes this cell as an external cell and returns the handover control to the BSC.

In order to avoid that a mobile station that is present in a cell in the virtual network different from the virtual cell 121 requests a handover to an external cell, the VNC may remove any external cells from the measurement list. An alternative is to provide external cells in the neighbor list with a flag indicating that handover to that cell is not permitted. Another alternative is that the VNC itself keeps track of which handover operations that are allowed. Since all handovers from a virtual cell has to be handled by the VNC, the VNC may easily deny requests for handovers to external cells except for mobile stations present in the virtual cell 121.

Figure 11B:
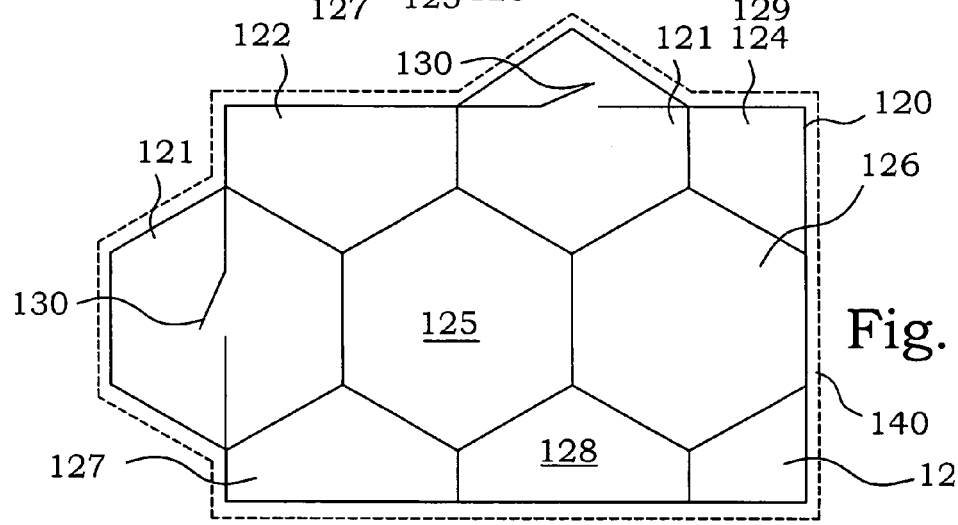

In FIG. 11B, the building 120 has two entrances. The entrance virtual cell 121 here has to be present at both entrances. The operation then follows the previously described principles. A small disadvantage in this context is that a position estimation may have difficulties in distinguishing between the different entrances 130.

Figure 11C:
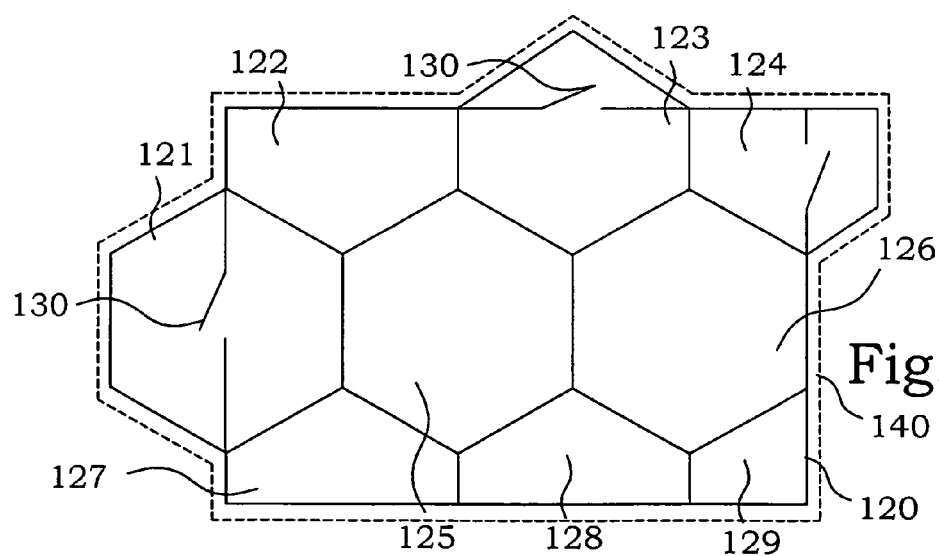

In FIG. 11C, another embodiment is illustrated, which easily operates with multiple entrances 130. Here, the "external" cell 140 of the base station associated with the building 120 is overlaid over the entire building area. The control signals and BSIC are available everywhere. However, when a mobile terminal enters into this cell, the mobile terminal will automatically by the VNC be handed over to a virtual cell, which thereby will provide the improved position estimation. The "external" cell 140 will thereby also be kept at a low usage level, which ensures free capacity for mobile stations entering or leaving the building. Such a common control channel will hence be used as an interface between the virtual network and the main network.

The translation of carriers and different channels of carriers between the external network and the virtual network may cause some minor complications. If a single carrier for control signals and a number of pure traffic channel carriers are used at the external network, but all carriers are used for control signals to different virtual base stations, the number of traffic channels in the virtual network is smaller than in the external network. The external network thus has to he informed about that there is such a limitation in the total amount of available resources. However, the exact configuration of these resources may not be necessary to know.

The VNC makes it possible to keep some information secret within the virtual network. The VNC is also suitable for adding other functionalities. In an area covered by a base station, for instance a building, there may be certain subareas, for which there are certain rules for using mobile terminals. In a hospital, the mobile terminals may influence vital medical equipment and therefore is the use of mobile terminals often forbidden in many hospital areas. However, there might be many locations within a hospital, where the use of mobile terminals anyway may be admitted. If a hospital is covered by a virtual network, the VNC can determine the accurate location of every mobile terminal. If a terminal comes close to an area, in which mobile terminals are forbidden, the VNC can either send a notification to the user, or simply disconnect the mobile terminal.

Another application suitable to integrate in a VNC could be entrance authorization. If a mobile terminal enters into an area, into which only authorized personnel is allowed to bring active mobile terminals, the VNC can in connection with e.g. a handover procedure request an authorization proof from the user of the mobile terminal. If the user can not provide such an authorization verification, the VNC may disconnect the call. Also, if a mobile tries to connect when already being in a restricted area, the VNC can request such authorization verifications.

Power control is another feature in which the VNC preferably operates as a moderator or translator means. Commands and measurements from the mobile and the BSC are translated into information that makes sense in the respective cell environment. The details of the actual implementations will not be discussed further.

The managing method according to the technology disclosed herein is primarily targeting managing in cellular mobile radio systems. GSM is the mobile radiotelephony standard used in the exemplary embodiments presented in this disclosure. However, the technology disclosed herein is also applicable on other cellular mobile radio systems and their related standards, such as e.g. other radio standards based on TDMA (Time Division Multiple Access), CDMA (Code Division Multiple Access), Wideband CDMA (WCDMA) and TDD (Time Division Duplex) technology.

In the above described GSM-based embodiments, the base station is the radio access station used in GSM. Likewise, the base station controller is the GSM example of a radio access station controller. In other systems, these types of nodes exist, but sometimes under somewhat different names. In WCDMA for example, access points and radio network controllers correspond to radio access stations and radio station access controllers, respectively. In 3G applications, the base station is typically denoted "node B". In the present disclosure, "radio access station" is intended to comprise all different types of base stations, node B's, access points etc. according to the used communication method.

In the described GSM-based embodiments, the time slot constitutes a physical channel. The physical channel is the smallest part of a radio resource that can be allocated to a single particular user. A carrier frequency can thereby be seen as a set of time slots (or physical channels) that all are available for use by a particular base station. The base station can also have access to more than one frequency carrier, i.e. to more than one set of physical channels.

In WCDMA, the physical channel is characterized by a particular code, typically a combination of a scrambling code and a channelisation code. Each access point can typically use physical channels having a particular scrambling code, in principle independent on the used channelisation codes. The naturally defined set of physical channels available for use by a particular radio access station is in WCDMA characterized by a particular scrambling code.

Also in other cellular communications systems, there is a smallest allocable resource unit, in the present disclosure called a physical channel. Each radio access station has furthermore typically access to a certain set of physical channels, predefined during cell planning or not. The principles regarding carriers and time slots in the above embodiments are therefore generally applicable to sets of physical channels and the physical channels themselves.

Figure 12:
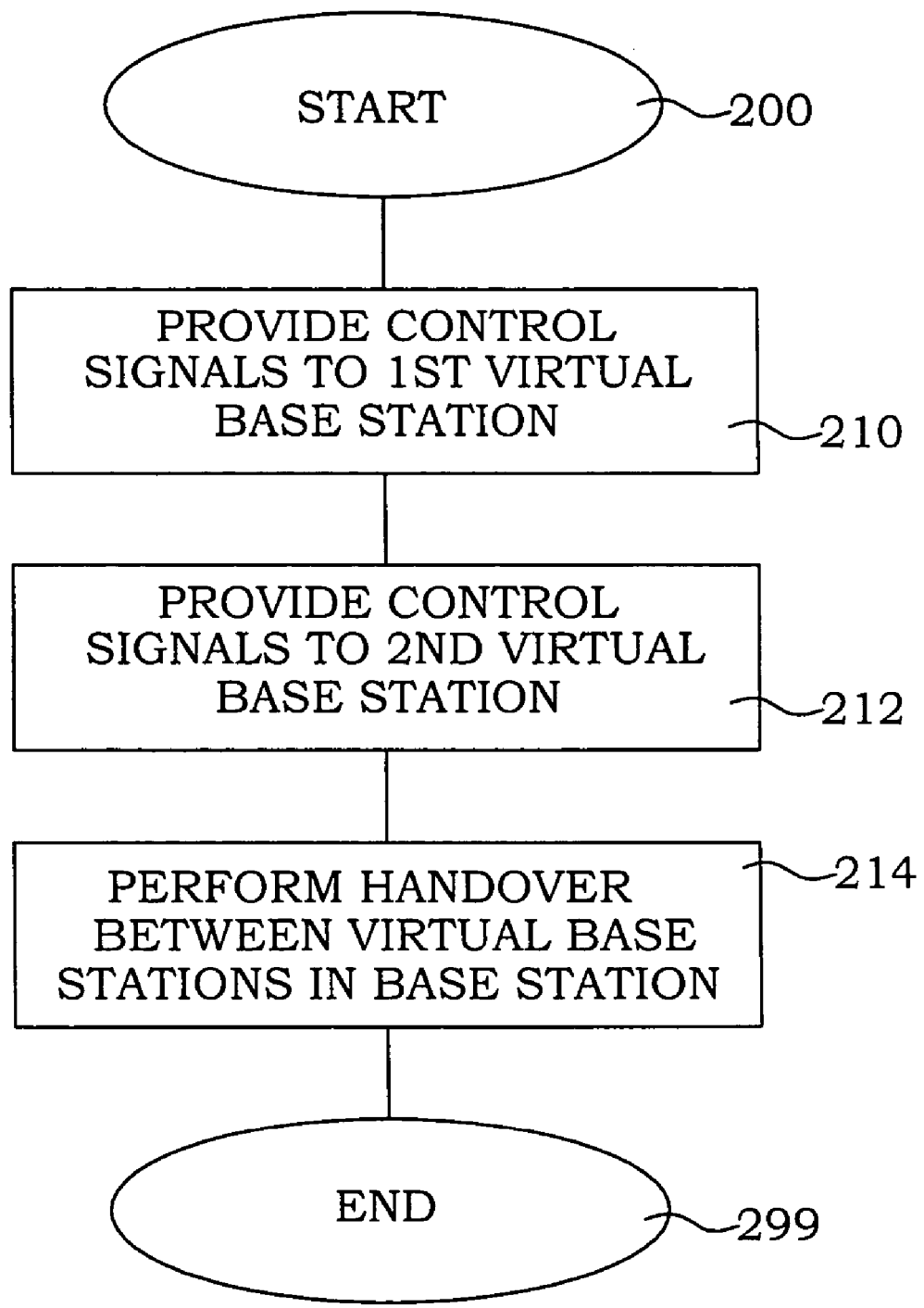
FIG. 12 is a flow diagram illustrating the main steps in an example embodiment of a method.

The main steps of an example embodiment of a method according to the technology disclosed herein are illustrated in FIG. 12. The procedure starts in step 200. In step 210, control signals associated with a first virtual base station is provided to a first antenna. In step 212, control signals associated with a second virtual base station is provided to a second antenna. A handover between the first and second virtual base stations is performed in a common base station controlling both virtual base stations in step 214. The procedure is ended in step 299.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A radio access station, having access to m sets of physical channels, m being an integer larger than 1, the radio access station comprising:
    antenna output for connection to n antennas, n being an integer larger than 1; and
    a virtual network controller, comprising a channel translator, mutually associating channels used for communication with a radio access station controller with physical channels of the sets of physical channels used by the n antennas;
    the virtual network controller being arranged to control handover operations between a first set of physical channels of the m sets of physical channels and a second set of physical channels of the m sets of physical channels;
    the virtual network controller comprising a position estimator configured to define the position of a mobile station communicating with one of the n antennas by accessing the associations in the channel translator and by having access to accurate position data of the antennas.

2. The radio access station according to claim 1, wherein:
    the virtual network controller being arranged to provide control signals associated with a first virtual radio access station on the first set of physical channels intended for a first antenna of the n antennas; and
    the virtual network controller being arranged to provide control signals associated with a second virtual radio access station, different from the first virtual radio access station, on the second set of physical channels intended for a second antenna of the n antennas.

3. The radio access station according to claim 1, wherein the virtual network controller is arranged to terminate information associated with the separate virtual radio access stations, and to communicate only the information associated with the radio access station as a whole to the radio access station controller, whereby a connected mobile terminal experiences the n antennas as antennas of separate cells, while the radio access station controller experiences the n antennas as antennas of one single cell.

4. The radio access station according to claim 1, wherein the virtual network controller further comprises means for position estimation based on neighbor lists.

5. The radio access station according to claim 4, wherein the virtual network controller further comprises means for modifying neighbor lists of connected mobile terminals for forwarding to the radio access station controller.

6. The radio access station according to claim 1, wherein the antenna output is an output of a common antenna cable.

7. The radio access station according to claim 1, wherein the virtual network controller comprises a broadcast control signal injector.

8. The radio access station according to claim 1, wherein at least one of the n antennas is connected by a separate antenna cable.

9. The radio access station according to claim 1, wherein the radio access station is selected from the list of:
   base station;
   access point; and
   node B.

10. The radio access station according to claim 1, wherein the radio access station operates according to GSM, whereby the sets of physical channels are frequency carriers and the physical channels are time slots.

11. The radio access station according to claim 1, wherein the radio access station operates according to CDMA or WCDMA, whereby the sets of physical channels are characterized by scrambling codes and the physical channels are characterized by channelisation codes.

12. The radio access station according to claim 1, further comprising means for restricting use of mobile terminals in areas covered by the radio access station.

13. The radio access station according to claim 12, wherein the means for restricting use comprises notification means, sending a notification to a mobile terminal when entering into an area of restricted use.

14. The radio access station according to claim 12, wherein the means for restricting use comprises disconnecting means, disconnecting communications to a mobile terminal being in an area of restricted use.

15. The radio access station according to claim 12, wherein the means for restricting use comprises authorization means, requesting an authorization verification from a mobile terminal being in or entering an area of restricted use.

16. A radio access network, comprising:
   radio access station controller;
   radio access station, having access to m sets of physical channels, m being an integer larger than 1; and
   n antennas connected to the radio access station, n being an integer larger than 1;
   the radio access station comprising a virtual network controller, in turn comprising a channel translator, mutually associating channels used for communication with the radio access station controller with physical channels of the sets of physical channels used by the n antennas;
   the virtual network controller being arranged to control handover operations between a first set of physical channels of the m sets of physical channels and a second set of physical channels of the m sets of physical channels;
   the virtual network controller comprising a position estimator configured to define the position of a mobile station communicating with one of the n antennas by accessing the associations in the channel translator and by having access to accurate position data of the antennas.

17. The radio access network according to claim 16, wherein:
   the virtual network controller being arranged to provide control signals associated with a first virtual radio access station on the first set of physical channels intended for a first antenna of the n antennas; and
   the virtual network controller being arranged to provide control signals associated with a second virtual radio access station, different from the first virtual radio access station, on the second set of physical channels intended for a second antenna of the n antennas.

18. The radio access net work according to claim 16, wherein the virtual network controller being arranged to terminate information associated with the separate virtual radio access stations, and to communicate only the information associated with the radio access station as a whole to the radio access station controller, whereby a connected mobile terminal experiences the n antennas as antennas of separate cells, while the radio access station controller experiences the n antennas as antennas of one single cell.

19. The radio access network according to claim 16, wherein the virtual network controller further comprises means for position estimation based on neighbor lists.

20. The radio access network according to claim 19, wherein the virtual network controller further comprises means for modifying neighbor lists of connected mobile terminals for forwarding to the radio access station controller.

21. The radio access net work according to claim 16, wherein the n antennas are connected by a common antenna cable.

22. The radio access network according to claims 16, further comprising signal selectors at each of the n antennas and in that the virtual network controller comprises a broadcast control signal injector.

23. The radio access network according to claim 16, wherein at least one of the n antennas is connected by a separate antenna cable.

24. The radio access net work according to claim 16, wherein the radio access station is selected from the list of:
   base station;
   access point; and
   node B.

25. The radio access net work according to claim 16, wherein the radio access station controller is selected from the list of:
   base station controller; and
   radio network controller.

26. The radio access network according to claim 16, wherein the radio access network operates according to GSM, whereby the sets of physical channels are frequency carriers and the physical channels are time slots.

27. The radio access net work according to claim 16, wherein the radio access network operates according to CDMA or WCDMA, whereby the sets of physical channels are characterized by scrambling codes and the physical channels are characterized by channelisation codes.

28. A method for managing a part of a mobile communications network, the method comprising:
   providing control signals associated with a first virtual radio access station on a first set of physical channels intended for a first antenna controlled by a radio access station;
   providing control signals associated with a second virtual radio access station, different from the first virtual radio access station, on a second set of physical channels intended for a second antenna controlled by the radio access station;
   mutually associating channels used for communication with a radio access station controller with physical channels of the sets of physical channels used by the first and second antennas;

performing, in the radio access station, a handover of a communication between the sets of physical channels of the first and second antennas; and defining a position of a mobile station communicating with one of the first and second antennas by accessing the channel associations and by having access to accurate position data of the first and second antennas.

29. The method according to claim 28, wherein the handover is performed transparently with respect to a radio access station controller controlling the radio access station.

30. The method according to claim 28, comprising the further step of:

adaptively associating physical channels of virtual radio access stations with communication channels of use between the radio access station and the radio access station controller.

31. The method according to claim 28, comprising the further step of:

estimating, in the radio access station, a position of a mobile terminal connected to a virtual radio access station.

32. The method according to claim 31, wherein the step of estimating is based on a content of a neighbor list.

33. The method according to claim 31, comprising the further step of:

restricting use of a mobile terminal in areas covered by the radio access station.

34. The method according to claim 33, wherein the step of restricting use comprises the step of notifying a mobile terminal when entering into an area of restricted use.

35. The method according to claim 33, wherein the step of restricting use comprises the step of disconnecting communications to a mobile terminal being in an area of restricted use.

36. The method according to claim 33, wherein the step of restricting use comprises the step of requesting an authorization verification from a mobile terminal being in or entering an area of restricted use.

* * * * *